United States Patent
Zlotos

(10) Patent No.: US 7,343,700 B2
(45) Date of Patent: Mar. 18, 2008

(54) AUTOMATIC CONTROL OF THE DRYING OF PARTICULATE MATERIAL

(75) Inventor: Michael Zlotos, Lauffen (DE)

(73) Assignee: Mann & Hummel ProTec GmbH, Ludwigsburg (DE)

(*) Notice: Subject to any disclaimer, the term of this patent is extended or adjusted under 35 U.S.C. 154(b) by 378 days.

(21) Appl. No.: 11/044,258

(22) Filed: Jan. 28, 2005

(65) Prior Publication Data

US 2006/0168843 A1 Aug. 3, 2006

(51) Int. Cl.
*F23N 5/00* (2006.01)
*F26B 3/00* (2006.01)

(52) U.S. Cl. .................. 34/482; 34/485; 34/491; 34/492; 34/493; 34/497

(58) Field of Classification Search .......... 34/482, 34/485, 487, 491, 492, 493, 497
See application file for complete search history.

(56) References Cited

U.S. PATENT DOCUMENTS 4,004,351 A * 1/1977 Sanneman et al. ............ 34/560
4,413,426 A * 11/1983 Graff .......................... 34/491
5,182,871 A * 2/1993 Karls .......................... 34/485
5,487,225 A * 1/1996 Downie ....................... 34/491

FOREIGN PATENT DOCUMENTS

| DE | 3131471 | 9/1982 |
| EP | 487829 | 6/1992 |
| EP | 711641 | 10/1999 |

* cited by examiner

*Primary Examiner*—Jiping Lu
(74) *Attorney, Agent, or Firm*—Crowell & Moring LLP

(57) ABSTRACT

A method and apparatus for drying particulate material in which the drying and discharge of the particulate material may be superimposed in such a way as to permit continuous drying of particulate material even when the supply is not continuous. The quantity of heat supplied to the particulate material is controlled as a function of signals ($\vartheta_i$; $h_i$) from temperature sensors mounted in the particulate material, which signals represent temperatures detected locally, and also as a function of a preselectable residence time ($T_v$) of the particulate material at a temperature within a preselectable target temperature range ($\vartheta_{min}$, $\vartheta_{max}$) and a preselectable throughput of dried particulate material such that the particulate material discharged has a temperature within the target temperature range ($\vartheta_{min}$, $\vartheta_{max}$) at least during the residence time ($T_v$).

13 Claims, 4 Drawing Sheets

AUTOMATIC CONTROL OF THE DRYING OF PARTICULATE MATERIAL

BACKGROUND OF THE INVENTION

This invention relates to a device for drying, in particular continuously, particulate material according to the preamble of claim 1 and a method for providing, in particular continuously, dried particulate material according to claim 13.

Plastics (i.e., synthetic resin materials) are often supplied in the form of granules or pellets for further processing. However, in order to process such plastic granules, a certain moisture content must not be exceeded. Therefore, plastic granules are dried. In the case of non-hygroscopic plastics, the moisture adhering to the surface of the plastics is removed by drying. In granulation of hygroscopic plastics, the moisture must also be removed from the pores in the interior of the granules.

Dryer systems and equipment for bulk particulate materials usually comprise an essentially cylindrical and upright container and/or drying hopper, which has a feed port for particulate material to be dried at the top end and has a closable discharge opening for particulate material at the bottom end which tapers in a conical shape, for example. Near the discharge opening, an inlet pipe for dry air leads from a dryer to the interior of the cylindrical container and an exhaust air pipe is provided near the feed port. During operation, particulate material introduced into the container, e.g., a powder or plastic granules or plastic pellets, falls through the container against a countercurrent of hot dry air which picks up the moisture entrained by the particulate material and removes it as exhaust air from the container.

The discharge of (dry) particulate material depends on the demand for dry particulate material for bulk processing machines connected to the discharge opening of the dryer, e.g., injection molding machines or extruders in the case of plastics. First, adequately dried granules must always be kept available for this purpose in the dryer. Second, the granules dwelling too long at the target temperature or overdrying of the granules must be prevented.

In particular, drying of granules of hygroscopic plastics requires a great input of energy to overcome the binding of moisture in the pores and to evaporate the liquid so that it can then be removed via the gas phase. This leads first to the problem of having to introduce a sufficient quantity of heat into the granules to be dried but second to the problem of being able to retain a required residual moisture content in the product after drying. The term "overdrying" refers to the effect whereby drying has been continued until the moisture content of the product is below the level required for the residual moisture content. In addition, the term "overdrying" also encompasses the effect whereby destructive changes in the plastic may occur when the residence time at high temperatures is too long. These may be chemical changes, for example, which may be caused in particular by oxidation, when drying is performed with air as the drying medium. Changes in the viscosity of the plastic are also of great importance for the processability in the downstream equipment.

When drying plastics, e.g., PET, a relatively low residual moisture content adhering to the granules or the pellets and/or bound in the particulate material or the granules must be removed. This requires not only dry air heating of the granules that are to be heated to a preselected target temperature of 170° C., for example, depending on the type of plastic, but also the granules must be kept at this temperature for a specified residence time.

It is known from German Patent No. DE 3,131,471 that with regard to the energy balance of the dryer system, the quantity of air throughput through the particulate material drying hopper should be reduced when there is an increase in the exhaust air temperature and should be increased when there is a decline in the exhaust air temperature. This should achieve the result that no more than the heat required for drying is supplied by the drying air to a dryer system that is operated at only partial load. Nevertheless, the energy balance remains unfavorable because practically all the particulate material present in the container must be heated before the exhaust air temperature has risen to the extent that the air throughput is reduced accordingly. A direct coordination with a specifiable residence time of the particulate material within a target temperature range is not possible on the basis of German Patent No. DE 3,131,471.

European Patent No. EP 487,829 discloses a particulate material dryer system in which instead of the exhaust air temperature, the temperature of the particulate material is detected by a temperature measuring device mounted in the container for controlling the air flow rate through the drying hopper. If the particulate material temperature detected by the temperature measuring device is below a specific limit, a discharge of particulate material through the discharge opening of the container can be interrupted by a warning signal generated by the temperature measuring device via a signal converter. If the temperature of the particulate material temperature rises too much, the signal converter may generate a control signal which leads to throttling of the quantity flow of air supplied.

However, one disadvantage of this arrangement is that the inferences from a single measured temperature value as to the drying status of the entire particulate material are unreliable. Since the drying status cannot be detected through the entire particulate material, it is impossible to be sure that the particulate material to be discharged has the required residual moisture content and has not been overdried.

European Patent No. EP 711,641 describes a particulate material drying hopper in which a tree of several temperature sensors arranged a distance apart, one above the other, is provided, their outputs being connected to a signal processing unit which includes a programmable microprocessor. The microprocessor processes the temperature data from the temperature sensors as well as information that is entered regarding the type of granules to be dried, the respective target temperature and residence time as well as the desired granule throughput and the density of the granular material and determines from this the temperature sensors below which the respective granules must be heated to the target temperature, must remain for a sufficient period of time at this temperature and supplies the desired granule throughput for discharge.

The microprocessor releases the granules for discharge only when the temperature sensor thus determined signals the target temperature and thus the residence time has elapsed. One disadvantage is that the particulate material dryer device blocks the discharge at a lower granule demand than at the set granule throughput when, for example, one or more plastic processing machines connected to the particulate material dryer device have been shut down, and it continues blocking the discharge until the full throughput of granules has been provided.

It is also provided [in that invention] that intermittent drying of a bulk feedstream in the container is to be performed in such a way that the quantity to be discharged is adequately dry. Another disadvantage is that it is impossible to run a continuous operation because superimposed drying and discharge of the particulate material are not intended in that patent.

Despite the efforts of the prior art, there remains a need for improved control of particulate material drying systems.

SUMMARY OF THE INVENTION

It is therefore an object of the present invention to provide an improved dryer system for drying bulk particulate material.

Another object of the invention is to provide a particulate material drying system with improved control.

A further object of the present invention is to simplify operation of the particulate material dryer system.

It is also an object of the invention to reduce the waiting times until release of the granule discharge.

Yet another object of this invention is to provide a possibility for drying particulate material in its passage through a container and/or drying hopper and for being able to remove the particulate material that has passed through the container immediately at the end, i.e., to superimpose the drying and the discharge of the particulate material so as to permit continuous operation.

A still further object of the invention, in particular for continuous operation of a particulate material dryer system, is to provide a possibility for ensuring that a specifiable residual moisture content will be reliably achieved while at the same time overdrying of the particulate material is prevented in its passage through the container.

These and other objects are achieved in accordance with the present invention by providing an apparatus for drying particulate material in a container and subsequently discharging dried particulate material from said container, comprising a feeder which supplies moist particulate material to the container, a device for discharging dried particulate material from the container, a gas supply line for supplying heated gas to the container so that the gas flows through the particulate material in the container, a gas outlet for exhausting gas from the container after is has flowed through the particulate material, at least two temperature sensors mounted at different vertical positions in the container, and a control unit which controls the supply of heated gas to the particulate material as a function of (a) signals from said temperature sensors representing temperatures detected at the sensor positions, (b) a preselectable residence time of the particulate material at a temperature within a preselectable target temperature range, and (c) a determinable throughput of dried particulate material, such that discharged particulate material has a temperature within said target temperature range at least during said residence time.

In accordance with a further aspect of the invention, the objects are achieved by providing a method for drying a particulate material, comprising providing at least two temperature measuring probes at different vertical positions in a container through which said particulate material flows; providing values for the vertical positions of the temperature measuring probes; providing a value for the cross-sectional area of said container; specifying a target temperature range; specifying a preselected residence time value for the particulate material at a temperature within said target temperature range; determining a desired volume flow of dried particulate material to be discharged; supplying moist particulate material to the container; introducing heated gas into the container such that the gas flows through the particulate material and is exhausted from the container after it has flowed through the particulate material; measuring the temperature as a function of the vertical position of each temperature sensor in the particulate material; determining the vertical position at which the lower temperature limit of the target temperature range occurs; determining the vertical position at which the upper temperature limit of the target temperature range occurs; determining the distance between the vertical positions of the lower temperature limit and the upper temperature limit; determining the actual residence time of the particulate material in the target temperature range; determining whether the actual residence time is equal to or greater than the preselected residence time, and discharging particulate material with a preselected volume flow when the actual residence time is greater than or equal to the preselected residence time.

Advantageous further refinements and preferred embodiments are described in detail hereinafter.

This invention thus makes available, for the first time, an apparatus for drying particulate material, in particular continuously, especially plastic granules, in a container and/or a drying hopper, and for discharge, in particular continuously, of dried particulate material from the container, namely with a device for supplying moist particulate material, a device for removing particulate material, a device for supplying heat and gas to the container and a device for removing the gas from the container so that the gas flows through the particulate material, at least two temperature sensors mounted in different vertical positions ($h_i$) in the container as well as a control device, wherein the control device is designed so that it controls the quantity of heat supplied to the particulate material as a function of the signals ($\vartheta_i$; $h_i$) of the temperature sensors representing the temperatures detected locally, a preselected residence time ($T_v$) of the particulate material at a temperature within a preselected target temperature range ($\vartheta_{min}$, $\vartheta_{max}$) and a preselectable throughput of dried particulate material, such that the particulate material discharged has a temperature within the target temperature range ($\vartheta_{min}$, $\vartheta_{max}$) at least during the residence time ($T_v$).

The term "quantity of heat" is understood here to refer to the energy supplied within an interval of time, e.g., a residence time, to the particulate material through the heat flow $\dot{Q}$, which is proportional to the product of the quantity flow of a gas used for drying and the temperature difference between the temperature of this gas and that of the particulate material.

This invention thus advantageously permits continuous discharge of particulate material with a desired volume flow, wherein drying of the particulate material to the desired residual moisture content is ensured. Furthermore, with this invention it is possible to achieve the advantage that the particulate material discharged essentially always—at least during the residence time ($T_v$)—has a temperature within the target temperature range ($\vartheta_{min}$, $\vartheta_{max}$) with each throughput, even if it changes or fluctuates unintentionally during operation of the apparatus.

Another advantage of this invention is that a specified residence time in the target temperature range can be achieved without any change in the outlet temperature of the plastic from the dryer hopper. It is thus possible to ensure that even when adjusting the operating parameters within the context of this invention, the dried plastic will enter the downstream equipment with no change in temperature.

Depending on the application, a residence time in a target temperature range at which desired residual moisture content is achieved can be specified for this. As a rule, for the choice of material, the residence time and the target temperature are also implicitly determined because the manufacturers of plastics specify the residence times in the target temperature range required for drying to a specific residual moisture content. For example, the relevant information may be provided in the form of barcodes on the containers that can be used as storage containers and detected by a corresponding device within the scope of this invention and made available for further processing. If this is not the case, if the residence time $T_v$ is not known empirically, it can be determined easily from a preliminary experiment.

The term "throughput" is used with respect to the particulate material in the same way as "quantity flow"; the term "quantity flow" may refer to both volume flow and mass flow, depending on whether the variables used are based on mass or volume. The throughput is determinable, i.e., a value for throughput can be preselected or determined through measurements.

If the dryer system is operated such that different materials to be dried are kept on hand in multiple storage containers, then according to this invention, an apparatus is to be made available, with which the values belonging to the respective material for the residence time $T_v$ and the limits of the target temperature range ($\vartheta_{min}$, $\vartheta_{max}$) can be specified. Different settings for the respective materials to be dried can therefore be run advantageously through the device automatically.

It is also within the scope of this invention to provide multiple units of the equipment required for the respective application case of the inventive device, so that particulate materials, in particular different particulate materials supplied in multiple storage containers, may be dried with one dryer, with the settings for operation of the dryer system and/or individual drying hoppers for the particular material being determined according to the discussion with regard to a granular product.

The inventive device achieves the advantage of linking the product property of the residual moisture content of the particulate material to be discharged reliably to the residence time and the target temperature range as operating parameters. The quantity of heat supplied has a direct influence on the temperature distribution in the container and/or drying hopper in addition to the flow profile of the particulate material falling through the container, while the residual moisture content, as a product property of the particulate material to be discharged, is only indirectly related to the quantity of heat supplied.

Therefore, in operation of the device according to this invention, the temperature distribution of the particulate material along the container is measured directly. The temperature can be measured easily; a multitude of temperature measuring probes are available for a wide variety of requirements. The measured variables and the target values in the form of temperature values used for control are the same type of parameters according to this invention. This invention thus makes possible a reliable means of controlling the drying of particulate material in an especially simple manner.

Furthermore, the device according to this invention may also comprise an apparatus for preselecting the throughput of dried particulate material. If maintaining a certain throughput value is necessary for the particular application case, there is thus a simple possibility of making this value available for further processing within the context of this invention.

In addition, this device may include an apparatus for measuring the throughput of dried particulate material. All the possibilities known to those skilled in the art may be used for such a measurement. For example, the throughput of dried particulate material may be measured by using weighing cells to determine the weight profile in the dryer hopper, by measuring the output of dried particulate material or with the help of a link to processing units downstream from the device, e.g., with their throughput in steady-state operation.

Due to the measurement of the quantity flow of dried particulate material being discharged, another parameter can be made available advantageously, thus making it possible to coordinate the operation of the device with the demand for dried particulate material. The device may therefore have in particular a unit for regulating or controlling the quantity flow of dried particulate material discharged.

The device may additionally have an apparatus for measuring the quantity flow of moist particulate material supplied. The term "quantity" in the context of the present document may be considered to include both mass and volume, depending on the measurement principle of the measuring apparatus. By measuring the quantity flow of moist particulate material supplied, another parameter may advantageously be made available, thus permitting coordination of operation of the device with the supply of particulate material to be dried. To do so, the device may comprise in particular an apparatus for regulating or controlling the quantity flow of moist particulate material supplied.

In another advantageous embodiment of this invention, the device may comprise a unit for supplying the gas. For example, a medium for the heat input may be supplied with the device itself, so that the device may be operated independently of whether gas can be made available at the site of use. This invention thus offers the advantage of extensive flexibility in use of the device.

Furthermore, the device may have an apparatus for measuring the quantity flow of heated gas supplied. This creates the prerequisite for metered addition of the quantity flow of heated gas supplied.

In addition, the device may have an apparatus for regulating or controlling the quantity flow of heated gas supplied. A possibility for controlling the heat flow supplied to the device and therefore the quantity of heat supplied to the device is thus created with the controlled supply of a preselectable quantity flow of heated gas.

In particular in cases when there is no option for raising the gas inlet temperature ($\vartheta_{gas,in}$), e.g., because product damage is to be feared if there is a further increase in temperature, the quantity flow of heat and gas supplied must be increased to supply the required quantity of heat for the desired drying.

From the standpoint of efficient utilization of the energy converted, it may also be desirable to adjust the quantity flow of heated gas supplied if the temperature of the gas leaving the drying hopper is significantly higher than the ambient temperature. The difference between the temperature of the gas leaving the drying hopper and the ambient temperature is in this case proportional to a quantity of heat which would have been available for drying but was dissipated without being utilized.

To avoid such cases, the basic principle according to German Patent No. DE 3,131,471 may be utilized, namely, from the standpoint of the energy balance of the dryer system, reducing the amount of gas throughput through the particulate material drying hopper when there is an increase in the exhaust air temperature and raising it when there is a drop in the exhaust air temperature.

This apparatus may also include a device for heating the gas to be supplied in order to be able to create a desired temperature gradient between the gas and the particulate material and thereby permit heat transfer from the gas to the particulate material. With the targeted adjustment of a preselectable temperature gradient between the gas and the particulate material, a second possibility is thus created for controlling the heat flow supplied to the device and thereby also controlling the quantity of heat supplied to the apparatus.

Furthermore, the apparatus may have a device for measuring the temperature of the heated gas supplied ($\vartheta_{gas,in}$). Another parameter may be made available to advantage by measuring the temperature of the heated gas supplied ($\vartheta_{gas,in}$), thereby permitting coordination of the temperature gradient between the gas and the particulate material. The apparatus may therefore comprise in particular a device for regulating or controlling the temperature of the heated gas supplied ($\vartheta_{gas,in}$).

The invention also provides a method for supplying, in particular continuously, dried particulate material, said method comprising the following steps:

a) Arranging at least two temperature measuring probes at different vertical positions ($h_i$) in a container, b) Providing values ($h_i$) for the positions of the temperature measuring probes, c) Providing a value for the cross-sectional area (A) in the container through which the particulate material flows, d) Preselecting a target temperature range ($\vartheta_{min}$, $\vartheta_{max}$), e) Preselecting a value for the residence time ($T_v$) of the particulate material at a temperature within a preselectable target temperature range ($\vartheta_{min}$, $\vartheta_{max}$)

f) Determining a value for the volume flow of dried particulate material to be discharged, g) Feeding the particulate material into the container, h) Feeding the heated gas into the container and removing the gas from the container so that the gas flows through the particulate material, i) Measuring the temperature as a function of the level in the particulate material at each position ($\vartheta_i(h_i)$), j) Determining the position (h ($\vartheta_{min}$)) at which the lower temperature limit ($\vartheta_{min}$) of the target temperature range occurs, k) Determining the position (h($\vartheta_{max}$)) at which the upper temperature limit ($\vartheta_{max}$) of the target temperature range occurs, l) Determining the vertical distance (H) between the positions (h($\vartheta_{min}$), h($\vartheta_{max}$)) determined in steps j) and k), m) Determining the residence time ($t_v$) in the target temperature range ($\vartheta_{min}$, $\vartheta_{max}$), n) Determining on whether the residence time ($t_v$) is equal to or greater than the preselected residence time ($T_v$), o) Discharging particulate material with a preselected volume flow when the residence time ($t_v$) is greater than or equal to the preselected residence time ($T_v$).

The method according to the invention advantageously permits continuous discharge of particulate material with a desired volume flow, ensuring that the particulate material is dried to the desired residual moisture content. Controlling the quantity of heat as a function of the measured temperature profile and its conversion to a residence time $t_v$ in a specifiable target temperature range makes it possible in a most surprisingly simple manner to reliably ensure adequate drying of the particulate material in discharge concurrently with drying.

To determine a value for the volume flow of dried particulate material to be discharged, the volume flow of dried particulate material to be discharged may be measured. It is also within the scope of this invention that a value is preselected for determining the volume flow of dried particulate material to be discharged. This invention thus advantageously offers the possibility of a flexible response to the requirements of the given application case.

Furthermore, a minimum filling level ($h_{min}$) may be preselected within the scope of the inventive method. This advantageously makes available a parameter with which it is possible to detect that the device is about to run dry.

If it is essential from the standpoint of product quality for a steady-state flow behavior of the particulate material falling through the container and/or the drying hopper to be established, then the minimum filling level $h_{min}$ may be set at a value which is only insignificantly below the total filling level of the container. Then the container is essentially always full during operation, so that fluctuations in the flow behavior of the plastic granules can be largely prevented. Therefore the heat transfer to the granules remains almost unchanged over time during operation, so that fluctuations in the course of drying of the granular particles leaving the device dried at different points in time can be essentially ruled out.

In particular when the residence time ($t_v$) is shorter than the preselected residence time ($T_v$), it is possible to check on whether the position at which the lower temperature limit of the target temperature range occurs (h($\vartheta_{min}$)) is greater than the minimum filling level ($h_{min}$). If the residence time ($t_v$) is shorter than the preselected residence time ($T_v$), then the distance H traveled at temperatures within the target temperature range is too short. To increase the distance H, a greater quantity of heat must be applied to the particulate material. However, this is appropriate only when an adequate quantity of particulate material is available at all, i.e., the position at which the lower temperature limit of the target temperature range occurs (h($\vartheta_{min}$)) is not already lower than the minimum filling level ($h_{min}$).

To increase the distance H in the case of a residence time ($t_v$) shorter than the preselected residence time ($T_v$), i.e., to be able to apply a larger quantity of heat to the particulate material and thereby maintain boundary conditions such that reliable operation remains ensured, it is then possible to check on whether production should be terminated when the position of the lower temperature limit of the target temperature range (h($\vartheta_{min}$)) is lower than the minimum filling level ($h_{min}$) and if this is the case, the discharge of particulate material is terminated. This makes available a simple option for shutting down operation.

Then if production is not to be terminated, the volume flow of the particulate material supplied to the container may be increased and the method of the invention may be continued at step i). The query has served to detect imminent running dry of the container and to counteract it so that further continuous operation can be maintained advantageously.

To ensure the safety of operation and to completely prevent damage to the particulate material due to excessively high thermal stress, a maximum allowed value may be preselected for the temperature ($\vartheta_{gas,max}$) of the heated gas supplied.

Excessive thermal stress on the particulate material is especially critical because it may occur in locally limited areas and there is therefore the risk of it not being detected by the measured temperature values. It is therefore a great advantage with respect to high product quality and complying with high safety requirements. But this invention ensures that thermal stress is virtually ruled out due to the settings of the operating parameters.

The temperature ($\vartheta_{gas,in}$) of the heated gas supplied may be measured as part of the method of the invention to advantageously make available a parameter on the basis of which imminent excessive thermal stress on the particulate material can be detected.

This creates the prerequisite for checking on whether the temperature ($\vartheta_{gas,in}$) of the heated gas supplied is lower than the maximum allowed value for the temperature ($\vartheta_{gas,max}$) of the heated gas supplied when the position at which the lower temperature limit of the target temperature range occurs (h($\vartheta_{min}$)) is higher than the minimum filling level. Only in this case is an increase in heating output justifiable. Thus through an additional query in performing the method, this invention offers a simple and reliable possibility of increasing safety and ensuring a high product quality.

In particular when the temperature ($\vartheta_{gas,in}$) of the heated gas supplied is lower than the maximum allowed value for the temperature ($\vartheta_{gas,max}$) of the heated gas supplied, the heated gas supplied is heated to a higher temperature and the method is continued at step i).

However, if the temperature ($\vartheta_{gas,in}$) of the heated gas supplied is greater than or equal to the maximum allowed temperature ($\vartheta_{gas,max}$) of the heated gas supplied, there is the risk of overdrying of the particulate material. Therefore, for this gas, the quantity flow of heated gas supplied is reduced according to this invention and in this way a smaller quantity of heat can be input into the particulate material, so that the method may be continued at step i).

BRIEF DESCRIPTION OF THE DRAWINGS

The invention will be described in further detail hereinafter with reference to illustrative preferred embodiments shown in the accompanying drawing figures, in which like parts are identified by the same reference numerals. In the drawings.

DETAILED DESCRIPTION OF PREFERRED EMBODIMENTS

Figure 1:
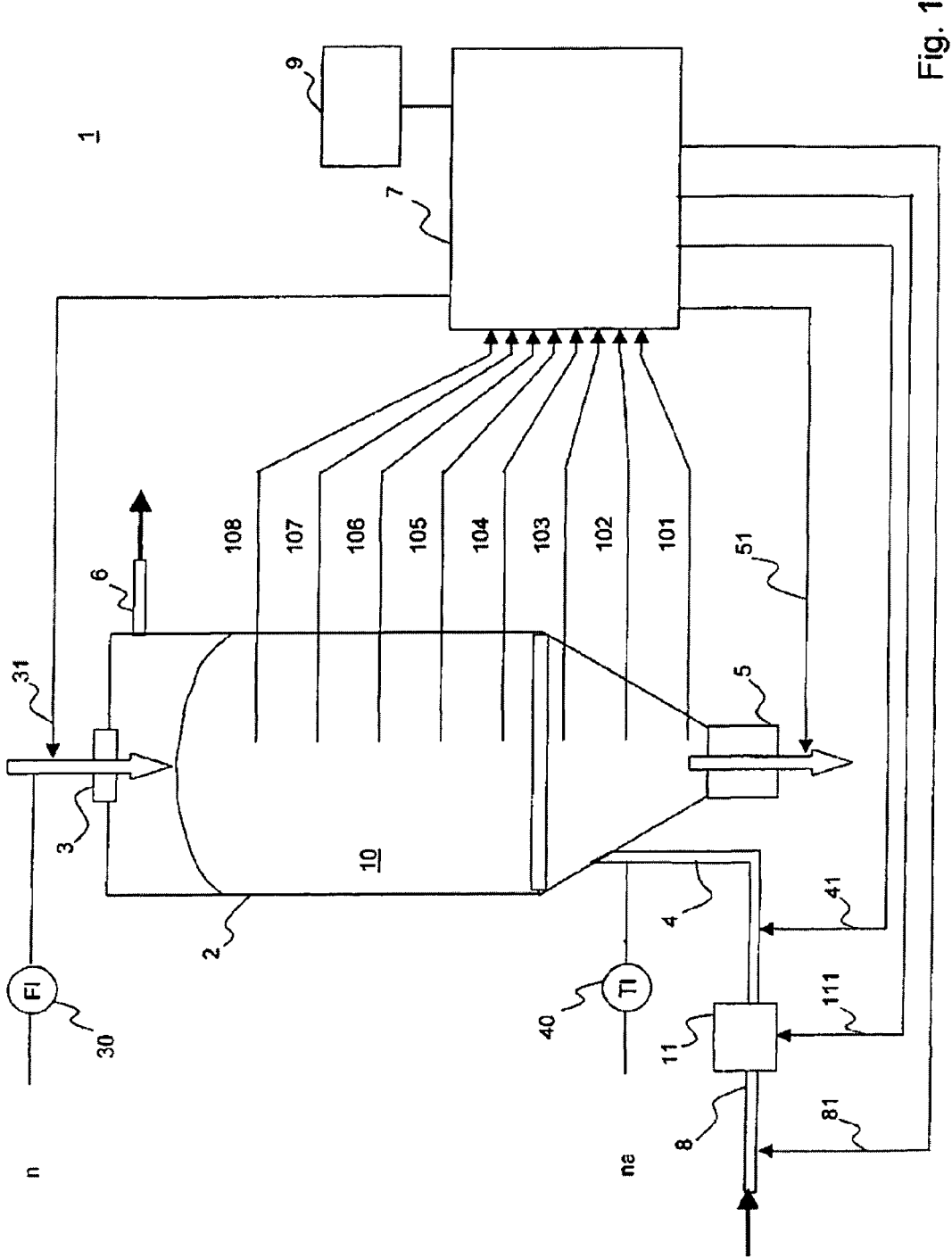
FIG. 1 is a schematic diagram of an apparatus for drying particulate material according to the invention.

The apparatus 1 for drying particulate material has an essentially cylindrical and upright container and/or drying hopper 2 which has a feed port 3 at the upper end for introducing particulate material 10 that is to be dried and a closable discharge opening 5 at a conically shaped lower end. This arrangement is illustrated in FIG. 1. A conveyor device may be provided beneath the discharge opening, for conveying the granules thus removed to one or more downstream processing machines. A feed pipe 4 for gas which is used to pick up the moisture content of the particulate material, e.g., dry hot air at 80° C., for example, opens into the interior of the container 2 in the lower part. This gas or hot dry air may leave the container through an exhaust air pipe 6 mounted at the top of the container 2.

The apparatus 1 for drying the particulate material is permanently provided with a control unit 7 having a microprocessor, a programmable memory and an input device 9. The sequence program for operation of the device 1 is contained in the memory. The memory is connected to the input device 9 in such a way that the sequence of the program can be modified according to the data input. Information regarding the shape and dimensions of the container 2, i.e., its diameter (from which it is possible to determine the area A through which particulate material flows), its height, details regarding the geometry of the conical part of the container 2, etc., may be stored in the memory and retrieved by the microprocessor.

Likewise, data may be entered via the input device 9 into the control unit 7, which can utilize this information as boundary values for the respective drying to be performed. Such data may include a preselectable residence time $T_v$, a desired throughput $\dot{V}_{P,out}$, the desired target temperature range ($\vartheta_{min}$; $\vartheta_{max}$), the minimum filling level $h_{min}$, and values for the positions $h_i$.

The cooperation of the aforementioned parts of the control unit 7 and their necessary interconnections will be apparent from the following description of the individual operating phases.

If the container 2 is filled with granules 10 to be dried, as shown here, the heated gas is introduced into the container 2 through the inlet pipe 4. Air is considered as an example of the gas in the following discussion and therefore the term "dry air" is also used. The dry air flows upward through the granular particulate material in the container, heating the granules and absorbing moisture from the granular particulate material while cooling and leaving the container 2 through the exhaust pipe 6.

The apparatus 1 includes temperature measuring probes, which are arranged at different vertical positions in the container 2. FIG. 1 shows eight temperature sensors 101, 102, 103, 104, 105, 106, 107 and 108 for the illustrative embodiment shown here, each sensor protruding into the granular particulate material 10. With the help of the temperature sensors 101 through 108, the temperature in the particulate material can be measured at the respective vertical positions $h_i$. During operation of the apparatus 1, a temperature profile is established in the particulate material 10 and can be detected in the form of signals ($\vartheta i$; $h_i$) from the temperature sensors. The signals ($\vartheta_i$; $h_i$) of the temperature sensors 101 through 108 are relayed to the control unit 7.

The volume flow $\dot{V}_{P,in}$ of granules supplied to the container can be measured by a measuring device 30. The measured value of the volume flow $\dot{V}_{P,in}$ is also transmitted to the control unit 7. The temperature $\vartheta_{gas,in}$ of the gas supplied to the container can be measured by a measuring device 40. The measured value for the temperature $\vartheta_{gas,in}$ is also transmitted to the control unit 7.

With the inclusion of the data that can be input via the input device 9, the control unit 7 can further process the signals of the temperature sensors supplied to it, representing the temperatures detected locally ($\vartheta_i$; $h_i$), and the measured values from the measuring devices 30 and 40 such that control signals with which continuous operation of the device 1 for continuous drying of particulate material can be maintained reliably within the framework of the desired parameters.

The control signal for controlling the volume flow $\dot{V}_{P,in}$ supplied to the device 1 can be sent to the particulate material feed through a line 31. A signal determined by the control unit 7 for controlling the quantity of gas supplied to the device 1 can be sent to the gas supply via a line 81.

A signal determined by the control unit 7 for controlling the heating output may be sent over a line 111 to a device 11 for heating the gas to be supplied to the container 2. The device 11 for heating the gas to be supplied to the container 2 is arranged in the feed line 8 for the gas in the illustrative embodiment shown here.

Furthermore, in order to control the quantity flow of gas to be supplied to the container 2, a signal determined by the control device 7 may also be sent over a line 41 to a device, e.g. a servo-valve, for adjusting the quantity flow of gas to be supplied to the container 2. A signal determined by the control unit 7 may be relayed via a line 51 to the discharge for particulate material from the container 2. With a response to the signal determined via the line 51, the discharge opening 5 in particular may be closed.

Figure 2:
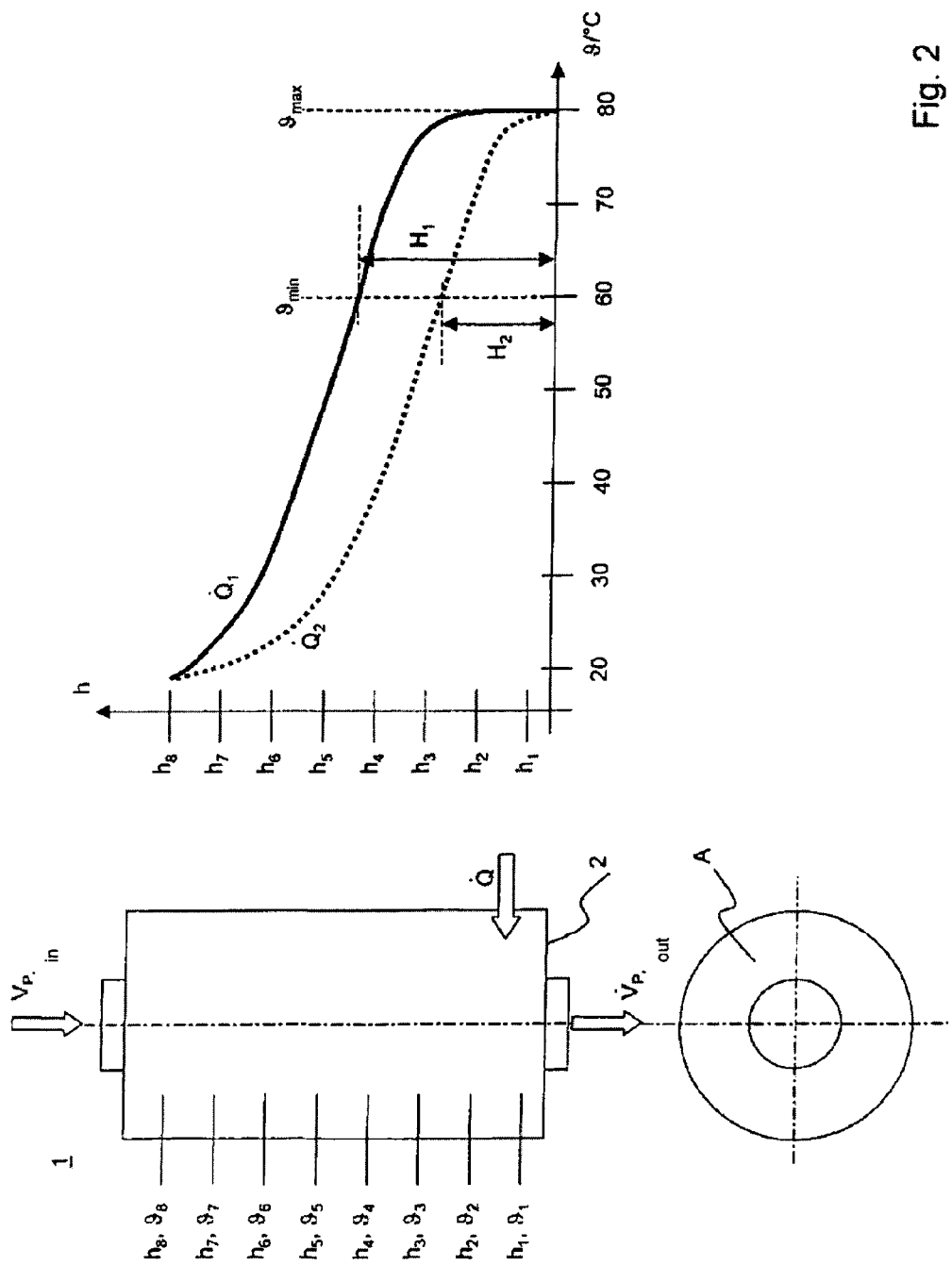
FIG. 2 is a schematic diagram of the apparatus for drying particulate material in an elevational view and a plan view to illustrate the operating principle of the invention in relation to a graphic representation of two drying curve examples.

The operation of the invention is illustrated by the diagrams in FIG. 2. The container 2 is shown schematically on the left side; a volume flow $\dot{V}_{P,in}$ of particulate material is supplied to this container and a volume flow $\dot{V}_{P,out}$ of particulate material is removed from this container. A heat flow $\dot{Q}$ is supplied to the container. As explained above, temperature measuring probes are mounted in the container, eight of them being shown here. Each temperature measuring probe determines a pair of values for the temperature detected locally. Each temperature sensor thus supplies a signal which contains information regarding the respective location of the temperature sensor $h_i$ and the temperature $\vartheta_i$ measured at this location $h_i$. Therefore, in the illustrative embodiment shown here, the corresponding value pairs are given at the temperature sensors ($h_1$; $\vartheta_1$), ($h_2$; $\vartheta_2$) through ($h_8$; $\vartheta_8$). From the value pairs thus determined, a vertical temperature profile through the container 2 may be determined.

Such a plot is shown graphically at the right side of FIG. 2 for two different heat flows $\dot{Q}_1$ and $\dot{Q}_2$. The vertical position h is plotted here verses the temperature $\vartheta$ in degrees Celsius. First the curve for the heat flow $\dot{Q}_1$ represented by a solid line shall be considered. Let us assume in the example considered here that the gas enters the container 2 with an input temperature of $\vartheta_{gas,in}$ at 80° C. at a level h=0. As it flows through the particulate material in the container 2, the gas is cooled to a temperature of 20° C., which is detected at the level $h_8$. The drying curve therefore extends between the values (h=0; 80° C.) and ($h_8$; 20° C.)

Within the scope of this invention, a target temperature range ($\vartheta_{min}$, $\vartheta_{max}$) can be preselected; the particulate material should also have a preselected residence time ($T_v$) within this range. In the example considered here, let us assume that the lower limit of the target temperature range $\vartheta_{min}$ is 60° C. and the upper limit of the target temperature range $\vartheta_{max}$ is 80° C. The two limits are shown as vertical dotted lines in the graph.

Thus, a dimension H for the distance traveled by the particulate material at a temperature within the preselected target temperature range ($\vartheta_{min}$, $\vartheta_{max}$) can be determined from the drying curve calculated from the signals ($\vartheta_i$, $h_i$) of the temperature sensors representing the locally detected temperatures.

The level at which the temperature $\vartheta_{min}$ prevails is represented by a horizontal dotted line intersecting the drying curve for the heat flow $\dot{Q}_1$. The temperature $\vartheta_{max}$ is at a level of h=0 because in the example in question here it corresponds to the temperature of the gas feed. This yields a distance $H_1$ which is traveled by the particulate material when a heat flow $\dot{Q}_1$ is supplied within a temperature range between $\vartheta_{min}$ and $\vartheta_{max}$. The residence time $t_v$ of the particulate material at a temperature within the target temperature range can then be calculated easily by multiplying the distance H thus determined times the cross-sectional area A of the container and then dividing by the volume flow $\dot{V}_{P,out}$ discharged from the device.

This invention thus makes it possible to easily determine the residence time of the particulate material flowing through the container 2 within a preselectable target temperature range.

If the volume flow $\dot{V}_{P,out}$ discharged remains constant but the heat flow $\dot{Q}$ supplied to the particulate material decreases, the residence time $t_v$ within the preselected target temperature range is reduced. This case is illustrated by the drying curve shown with a dotted line in the diagram for the heat flow $\dot{Q}_2$.

By analogy with the procedure described above, the distance $H_2$ traveled by the particulate material within the target temperature range ($\vartheta_{max}$; $\vartheta_{min}$) is obtained in the example for the heat flow $\dot{Q}_2$. Since the reduction in temperature within the particulate material through which the gas is flowing has already proceeded further at the lower levels h in the case of the smaller heat flow $\dot{Q}_2$, i.e., lower temperatures prevail at lower levels than in the case of the greater heat flow $\dot{Q}_1$, the temperature $\vartheta_{min}$ is therefore reached at a lower level h than in the case of the greater heat flow, and accordingly the distance traveled within the target temperature range $H_2$ is smaller than in the case of the greater heat flow $\dot{Q}_1$. When the volume $\dot{V}_{P,out}$ discharged remains constant, this yields a shorter residence time $t_v$ within the target temperature range.

By setting suitable values for the target temperature range and the residence time $T_v$ of the particulate material at a temperature within the selected temperature range, a suitable set of boundary conditions can be established based on preliminary experiments for the respective product to be dried such that if these boundary conditions are maintained, the drying process can be performed reliably in the desired manner.

Based on the distribution of the temperature and the moisture load of the particulate material in both vertical and horizontal directions inside the container, this procedure is especially reliable because due to the empirical determination of the boundary data of the desired residence time in the target temperature range that fit for the respective case, such local deviations from values measured at certain positions play hardly any role at all in the process as a whole.

Figure 3:
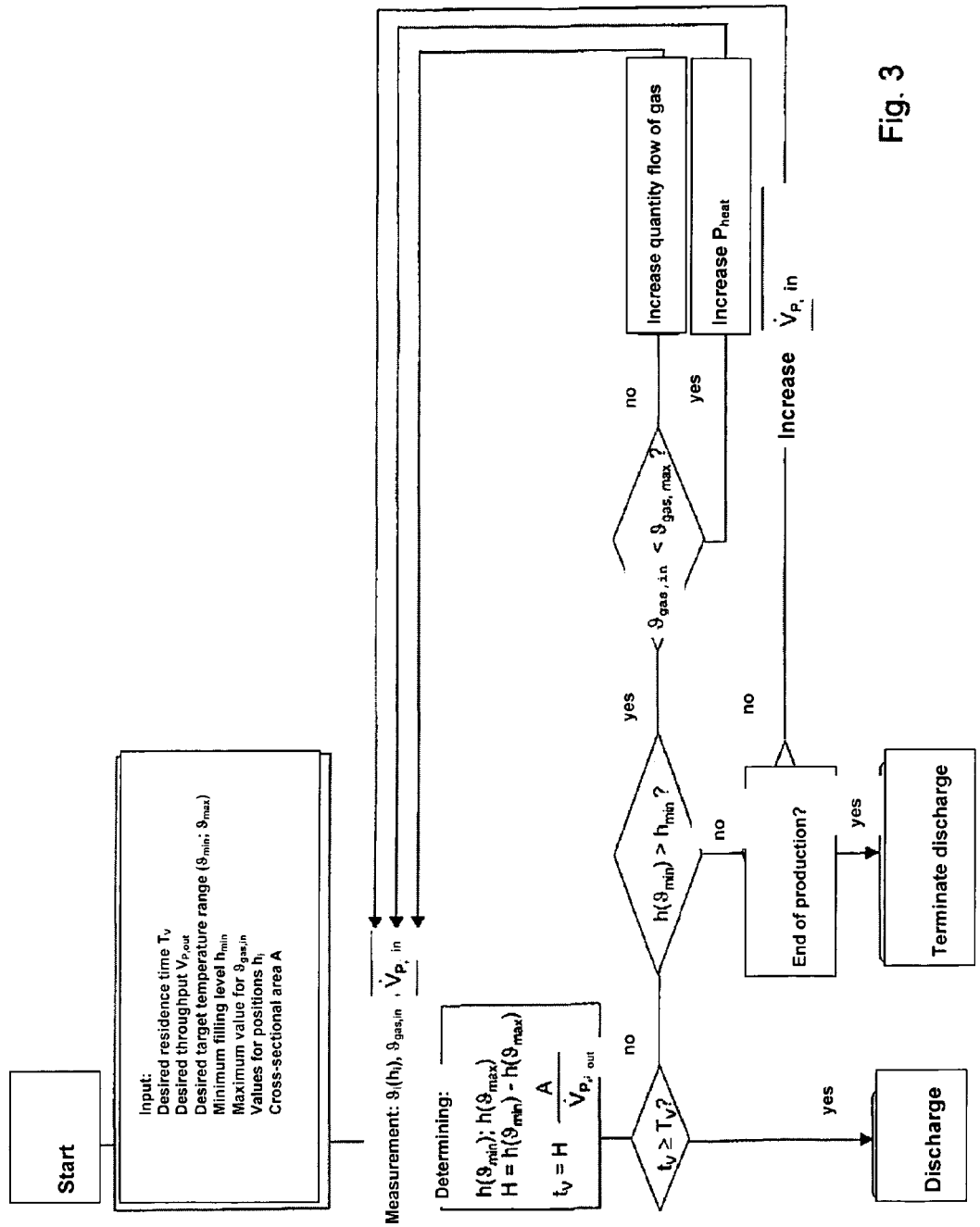
FIG. 3 is a schematic diagram of a flow chart depicting the sequence of the inventive method according to a first illustrative embodiment.

FIG. 3 shows the principles of the method of the invention according to a first option with reference to a schematic flow chart. At the beginning, values for the parameters to be set can be input. For example, the desired residence time $T_v$, the desired throughput $\dot{V}_{P,out}$ and the desired target temperature range ($\vartheta_{min}$, $\vartheta_{max}$) may be input. In addition, values for the minimum filling level $h_{min}$, a maximum value for the temperature of the gas supplied $\vartheta_{gas,in}$ and values for the positions $h_i$ and the cross-sectional area A of the container 2 may be input.

During operation at positions $h_i$, the temperatures $\vartheta_i(h_i)$ and the temperature of the gas supplied $\vartheta_{gas,in}$ and the volume flow of particulate material $\dot{V}_{P,in}$ supplied to the container are measured. From this data, the values belonging to the limits of the target temperature range are determined for the vertical positions $h(\vartheta|_{min})$ and h ($\vartheta_{max}$). The distance $H = h(\vartheta_{min}) - h(\vartheta_{max})$ traveled by the particulate material in the target temperature range are determined from this information. Then the residence time $t_v$ of the particulate material at a temperature in the target temperature range can be calculated from this. The next step determines whether the residence time $t_v$ within the target temperature range is greater than or equal to the preselected desired residence time $T_v$. If this is the case, the particulate material may be discharged.

If this is not the case, the next query step determines whether the position $h(\vartheta_{min})$ is higher than the minimum filling level $h_{min}$. This query ensures that there is no unintentional emptying of the container below the minimum filling level $h_{min}$.

If the position $h(\vartheta_{min})$ at which the lower limit of the target temperature range is reached is lower than the minimum filling level $h_{min}$, then the next query step checks on whether the end of production is desired. If this is the case, the discharge is concluded. If this is not the case, a control signal is generated in the control unit 7, containing the instruction to increase the volume flow of particulate material $\dot{V}_{P,in}$ supplied to the device.

Once this has occurred, measured values $\vartheta_i(h_i)$, $\vartheta_{gas,in}$ and $\dot{V}_{P,in}$ are again recorded, and the additional parameters used for control are determined as described above and the process is continued.

If the vertical position $h(\vartheta_{min})$ is higher than the minimum filling level, a check is performed in the next step to determine whether the measured value for the inlet temperature of the gas $\vartheta_{gas,in}$ is below the maximum allowed value $\vartheta_{gas,max}$. If this is the case, the heating output may be increased. This causes a control signal to be output by the control unit with the information that the heating output should be increased. Following this, measured values are then recorded in the manner described above and the quantities to be used for control are determined from them and the process is continued.

If the inlet temperature $\vartheta_{gas,in}$ of the gas to be supplied is not lower than the maximum allowed inlet temperature $\vartheta_{gas,max}$, the heating output cannot be increased for safety reasons. To increase the heat flow supplied to the particulate material in this case, it is therefore necessary to increase the quantity flow of gas supplied in this case. Therefore, in this case the control unit prompts the generation of a signal with the information that the quantity flow of gas to be supplied should be increased. Then again as described above, measured values are recorded and from them the required variable for operation of the device and/or for implementation of the method are determined.

Figure 4:
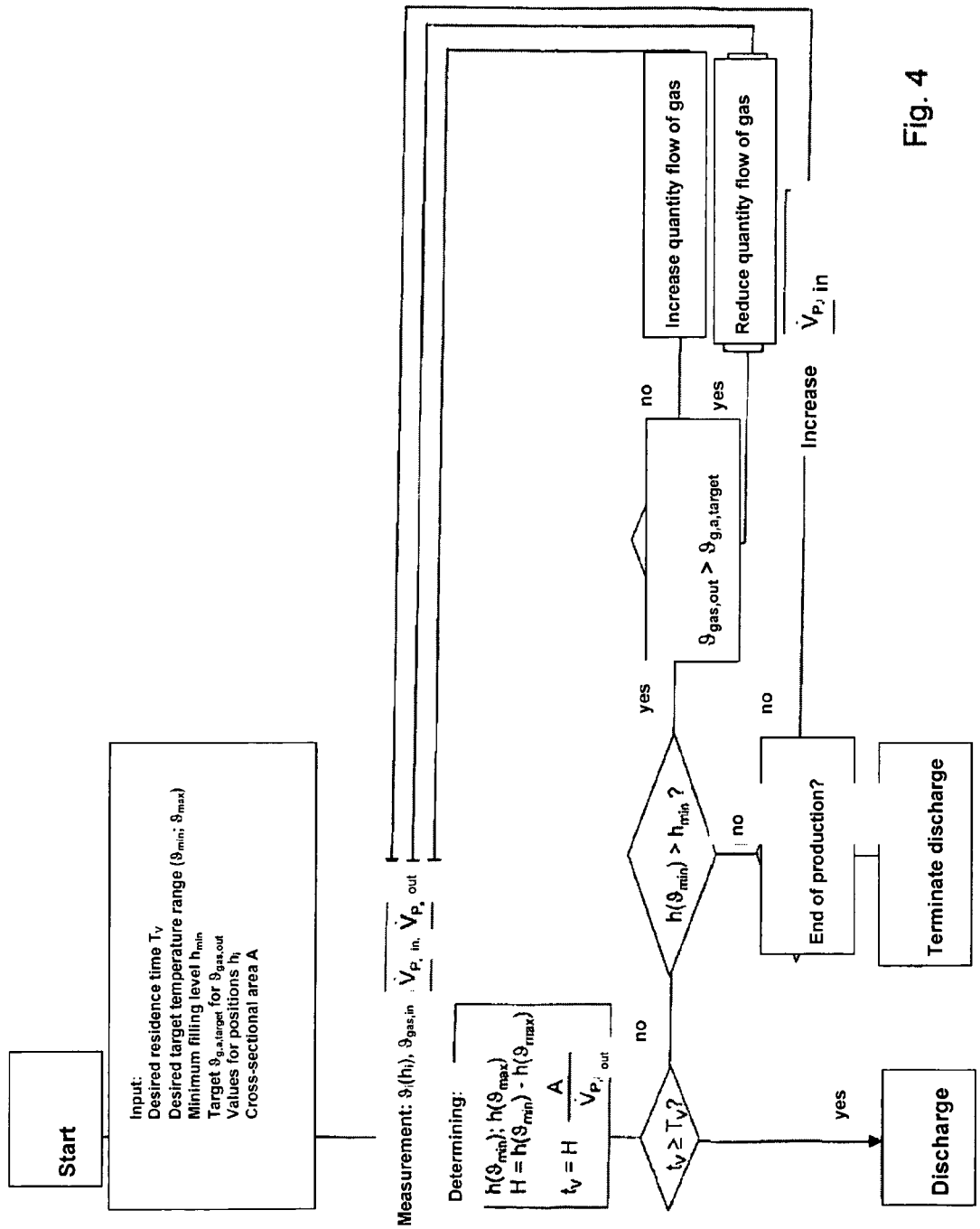
FIG. 4 is a schematic diagram of a flow chart depicting the sequence of the inventive method according to a second illustrative embodiment.

FIG. 4 shows the principal features of the method of the invention according to a second option with reference to a schematic flow chart. At the beginning, values for parameters to be defined can be input. In contrast with the first option described above for carrying out the method of the invention, in this case no value is preselected for the desired throughput in addition to the desired residence time $T_v$, the desired target temperature range ($\vartheta_{min}$, $\vartheta_{max}$), a value for the minimum filling level $h_{min}$, values for the position $h_i$ and the cross-sectional area A of the container 2. In addition, a target value $\vartheta_{g,a,target}$ for the temperature of the gas $\vartheta_{gas,out}$ leaving the container is preselected.

During operation, the temperatures $\vartheta_i(h_i)$ and the temperature $\vartheta_{gas,in}$ of the gas supplied and the volume flow of particulate material $\dot{V}_{P,in}$ supplied to the container are measured at the positions $h_i$ according to the first option described above. In addition, the volume flow of dried particulate material discharged from the container is also measured. Thus the method is able to respond to changes in throughput during operation and the parameters can be controlled accordingly, so that even when there are variations in throughput, the drying is performed reliably according to the requirements of the product. This method of conducting the process is especially advantageous when fluctuations in throughput are expected.

To determine the residence time $t_v$ of the particulate material at a temperature in the target temperature range, the procedure described above is followed. If the residence time $t_v$ within the target temperature range is greater than or equal to the preselected desired residence time $T_v$, the particulate material may be discharged.

The question of whether the position $h(\vartheta_{min})$ is higher than the minimum filling level $h_{min}$ as well as the determination of whether termination of production is desired and the corresponding continuation and/or termination of the method are consistent with the procedure described above.

In comparison with the procedure of the method described above, in this case a different method of controlling the quantity of heat supplied to the container is used. The next step evaluates whether the measured value for the outlet temperature of the gas $\vartheta_{gas,out}$ is less than or equal to the specified target value $\vartheta_{g,a,target}$. As long as this target value is not exceeded, the quantity flow of gas may be increased. To do so, a control signal with the instruction that the quantity flow of gas should be increased is output by the control unit and relayed to the apparatus for adjusting the quantity flow of gas to be supplied to the container. Following that, measured values are again recorded in the manner described above and the quantities to be used for the control are determined from them, and the method is continued.

If the measured value for the outlet temperature of the gas $\vartheta_{gas,out}$ is greater than the specific target value $\vartheta_{g,a,target}$, then the quantity flow of gas supplied is reduced and thus thermal energy is saved. Therefore in this case, the control unit is prompted to generate a signal with the information that the quantity flow of gas to be supplied is to be reduced. Then measured values may in turn be recorded as described above and the required quantities are determined from them for operation of the device and/or for carrying out the method.

The option of controlling the quantity flow of gas to be supplied to the device as a function of the outlet temperature of the gas is, of course, not tied to measurement of throughput. The throughput can be determined by measurement within the scope of the option described first as well as in particular without any further changes in the method. Likewise, control of the quantity flow of gas to be supplied to the device may be carried out as part of the first option described above, with the throughput being determined by selection of a desired value.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for drying a particulate material, comprising:
    a) providing at least two temperature measuring probes at different vertical positions in a container through which said particulate material flows,
    b) providing values for the vertical positions of the temperature measuring probes,
    c) providing a value for the cross-sectional area of said container,
    d) specifying a target temperature range,
    e) specifying a residence time value for the particulate material at a temperature within said target temperature range,
    f) determining a desired volume flow of dried particulate material to be discharged,
    g) supplying moist particulate material to the container,
    h) introducing heated gas into the container such that the gas flows through the particulate material, and exhausting the gas from the container after it has flowed through the particulate material,
    i) measuring the temperature as a function of the vertical position of each temperature sensor in the particulate material,
    j) determining the vertical position at which the lower temperature limit of the target temperature range occurs,
    k) determining the vertical position at which the upper temperature limit of the target temperature range occurs,
    l) determining the distance between the vertical positions determined in steps j) and k),
    m) determining the actual residence time of the particulate material in the target temperature range,
    n) determining whether the actual residence time is equal to or greater than the preselected residence time, and
    o) discharging particulate material with a preselected volume flow when the actual residence time is greater than or equal to the preselected residence time.

2. A method according to claim 1, wherein said particulate material is dried and discharged continuously.

3. A method according to claim 1, wherein for determining a value for the volume flow of dried particulate material to be discharged, the volume flow of dried particulate material to be discharged is measured.

4. A method according to claim 1, wherein for determining a value for the volume flow of dried particulate material to be discharged, the volume flow of dried particulate material to be discharged is preselected.

5. A method according to claim 1, wherein a minimum filling level is preselected.

6. A method according to claim 5, wherein when the actual residence time is shorter than the preselected residence time, a check is performed to determine whether the position where the lower temperature limit of the target temperature range occurs is greater than the minimum filling level.

7. A method according to claim 6, wherein if the position at which the lower temperature limit of the target temperature range occurs is lower than the minimum filling level, discharge of particulate material is terminated.

8. A method according to claim 6, wherein if the position at which the lower temperature limit of the target temperature range occurs is lower than the minimum filling level, the volume flow of particulate material supplied to the container is increased and the method is continued.

9. A method according to claim 1, wherein the temperature of the heated gas supplied is measured.

10. A method according to claim 9, wherein a maximum allowed value for the temperature of the heated gas supplied is preselected.

11. A method according to claim 10, wherein if the position at which the lower temperature limit of the target temperature range occurs is higher than a minimum filling level, a check is performed to determine whether the temperature of the heated gas supplied is lower than said maximum allowed value for the temperature of the heated gas supplied.

12. A method according to claim 11, wherein if the temperature of the heated gas supplied is lower than said maximum allowed value for the temperature of the heated gas supplied, the heated gas supplied is heated to a higher temperature and the method is continued.

13. A method according to claim 11, wherein if the temperature of the heated gas supplied is higher than or equal to the maximum allowed value for the temperature of the heated gas supplied, the quantity flow of heated gas supplied is increased and the method is continued.

* * * * *